US012763521B2

(12) United States Patent
Kuroda et al.

(10) Patent No.: US 12,763,521 B2
(45) Date of Patent: Oct. 13, 2026

(54) ELECTRICAL CONNECTOR ASSEMBLY COMPRISING AN ELECTRICAL CONNECTOR WITH A LEVER ENGAGING A MATING ELECTRICAL CONNECTOR

(71) Applicant: ISUZU MOTORS LIMITED, Tokyo (JP)

(72) Inventors: Susumu Kuroda, Fujisawa (JP); Junichi Miwa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 233 days.

(21) Appl. No.: 18/552,409

(22) PCT Filed: Mar. 23, 2022

(86) PCT No.: PCT/JP2022/013410
§ 371 (c)(1),
(2) Date: Sep. 25, 2023

(87) PCT Pub. No.: WO2022/202883
PCT Pub. Date: Sep. 29, 2022

(65) Prior Publication Data

US 2024/0178618 A1 May 30, 2024

(30) Foreign Application Priority Data

Mar. 26, 2021 (JP) ................................ 2021-053714

(51) Int. Cl.
*H01R 13/639* (2006.01)
*H01R 13/502* (2006.01)
(Continued)

(52) U.S. Cl.
CPC ......... *H01R 13/639* (2013.01); *H01R 13/502* (2013.01); *H01R 13/516* (2013.01);
(Continued)

(58) Field of Classification Search
CPC .. H01R 13/639; H01R 13/502; H01R 13/516; H01R 13/5213; H01R 13/533;
(Continued)

(56) References Cited

U.S. PATENT DOCUMENTS

2005/0082840 A1 4/2005 Ichida et al.
2006/0057881 A1 3/2006 Ichida et al.
(Continued)

FOREIGN PATENT DOCUMENTS

CN 1658442 A 8/2005
CN 101222093 A 7/2008
(Continued)

OTHER PUBLICATIONS

Patent Cooperation Treaty, International Search Report, Application No. PCT/JP2022/013410, dated May 24, 2022, in 5 pages.
(Continued)

*Primary Examiner* — Justin M Kratt
(74) *Attorney, Agent, or Firm* — PROCOPIO, CORY, HARGREAVES & SAVITCH LLP

(57) ABSTRACT

A connector assembly includes a connector, and a connector cover fitted around the connector to cover the connector. The connector includes a connector body extending in an axial direction between a base end portion and a tip end portion, a lever disposed radially outward of the connector body and extending in the axial direction, an elastically deformable coupling portion integrally coupling an intermediate portion of the lever to the connector body, the coupling portion serving as a rotation center of the lever, an engaging portion provided at a tip end portion of the lever and configured to be engaged with a mating connector, and an operation surface provided on a base end portion of the lever and directed radially outward of the connector body in order to
(Continued)

rotate the lever. The connector cover includes an abutment portion abutted against the operation surface.

8 Claims, 1 Drawing Sheet

(51) Int. Cl.

| | |
|---|---|
| ***H01R 13/516*** | (2006.01) |
| ***H01R 13/52*** | (2006.01) |
| ***H01R 13/533*** | (2006.01) |
| ***H01R 13/629*** | (2006.01) |
| ***H01R 13/641*** | (2006.01) |
| *H01R 13/62* | (2006.01) |
| *H01R 13/64* | (2006.01) |

(52) U.S. Cl.
CPC ....... *H01R 13/5213* (2013.01); *H01R 13/533* (2013.01); *H01R 13/62933* (2013.01); *H01R 13/641* (2013.01); *H01R 13/52* (2013.01); *H01R 13/521* (2013.01); *H01R 13/62* (2013.01); *H01R 13/64* (2013.01)

(58) Field of Classification Search
CPC H01R 13/62933; H01R 13/641; H01R 13/52; H01R 13/521; H01R 13/62; H01R 13/64
See application file for complete search history.

(56) References Cited

U.S. PATENT DOCUMENTS

| | | | |
|---|---|---|---|
| 2006/0079110 | A1 | 4/2006 | Ichida et al. |
| 2009/0029584 | A1 | 1/2009 | Sami |

FOREIGN PATENT DOCUMENTS

| | | | | |
|---|---|---|---|---|
| CN | 101355212 | A | | 1/2009 |
| CN | 101859948 | A | | 10/2010 |
| JP | 2004-179040 | A | | 6/2004 |
| JP | 2004-281370 | A | | 10/2004 |
| JP | 2010-196652 | A | | 9/2010 |
| JP | 2011044303 | A | * | 3/2011 |
| JP | 2018-147613 | A | | 9/2018 |

OTHER PUBLICATIONS

Patent Cooperation Treaty, WOSA, Application No. PCT/JP2022/013410, dated May 24, 2022, in 4 pages.
The State Intellectual Property Office of People's Republic of China, Office Action, Application No. 202280025120.X on Jun. 27, 2026, in 12 pages.

* cited by examiner

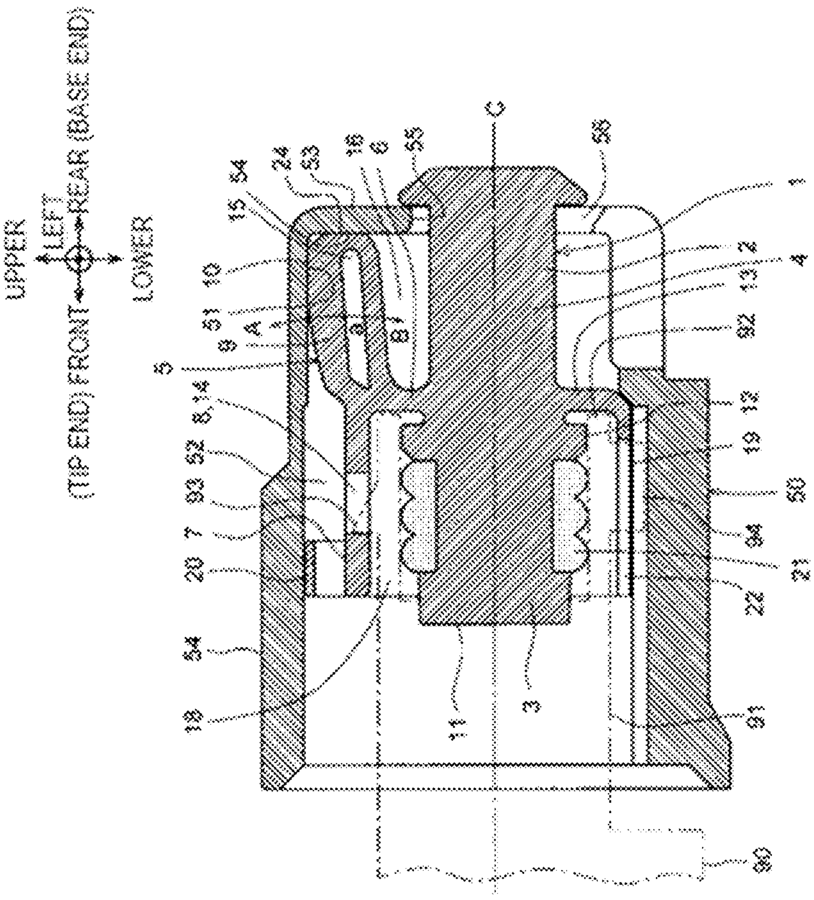
UPPER
LEFT
REAR (BASE END)
(TIP END) FRONT
LOWER
C
1
2
3
4
5
6
7
8,14
9
10
11
12
13
15
16
18
19
20
21
22
24
50
51
52
53
54
55
56
90
91
92
93
94
A
B

ELECTRICAL CONNECTOR ASSEMBLY COMPRISING AN ELECTRICAL CONNECTOR WITH A LEVER ENGAGING A MATING ELECTRICAL CONNECTOR

CROSS-REFERENCE TO RELATED APPLICATIONS

This application is US National Stage of International Patent Application PCT/JP2022/013410, filed Mar. 23, 2022, which claims benefit of priority from Japanese Patent Application JP2021-053714, filed Mar. 26, 2021, the contents of both of which are incorporated herein by reference.

TECHNICAL FIELD

The present disclosure relates to a connector assembly.

BACKGROUND ART

A connector that provides electrical connection to a component of an engine is known. Further, a connector cover fitted around the connector to cover the connector is also known, and a connector assembly is formed by the connector and the connector cover.

CITATION LIST

Patent Literature

Patent Literature 1: JP2010-196652A

SUMMARY OF INVENTION

Technical Problem

The connector is provided with a lever that can be rotated due to elastic deformation, and the connector is locked to a mating connector by engaging an engaging portion formed at a tip end portion of the lever with the mating connector. When a base end portion of the lever is pressed, the engagement of the engaging portion is released and the lock of the connector is released.

During operation of the engine, vibration of the engine is transmitted from the component to the connector, and the connector vibrates. Due to the vibration, the lever is rotated, the vibration of the connector increases, and terminals of the connector may be damaged.

Therefore, the present disclosure is made in view of such circumstances, and an object thereof is to provide a connector assembly capable of preventing vibration of a connector.

Solution to Problem

According to one aspect of the present disclosure, there is provided a connector assembly including: a connector; and a connector cover fitted around the connector to cover the connector, in which the connector includes:

- a connector body extending in an axial direction between a base end portion and a tip end portion;
- a lever disposed radially outward of the connector body and extending in the axial direction:
- an elastically deformable coupling portion integrally coupling an intermediate portion of the lever to the connector body, the coupling portion serving as a rotation center of the lever;

- an engaging portion provided at a tip end portion of the lever and configured to be engaged with a mating connector; and
- an operation surface provided on a base end portion of the lever and directed radially outward of the connector body in order to rotate the lever, and the connector cover includes an abutment portion abutted against the operation surface.

Preferably, the abutment portion is made of an elastic material.

Preferably, a whole of the connector cover is made of an elastic material.

Preferably, a radial gap is formed between the base end portion of the lever and the connector body, and no portion of the connector cover exists in the gap.

Preferably, a radial gap is formed between the base end portion of the lever and the base end portion of the connector body, and the base end portion of the lever is radially rotatable around the coupling portion.

Preferably, the lever is configured such that, when the operation surface receives a pressing force via the connector cover, the base end portion of the lever is rotatable radially inward around the coupling portion, and the tip end portion of the lever is rotatable radially outward of the connector body around the coupling portion.

Preferably, the abutment portion of the connector cover is abutted against the operation surface of the lever, and prevents the base end portion of the lever from radially outward rotating around the coupling portion.

Preferably, a radial gap is formed between the tip end portion of the lever and the connector cover.

Preferably, the connector is configured to be connected to a mating connector of a component attached to an engine.

Advantageous Effects of Invention

According to the present disclosure, vibration of the connector can be prevented.

BRIEF DESCRIPTION OF DRAWINGS

FIGURE is a side cross-sectional view showing a connector assembly of the present embodiment.

DESCRIPTION OF EMBODIMENTS

Hereinafter, an embodiment of the present disclosure will be described with reference to the accompanying drawing. It should be noted that the present disclosure is not limited to the following embodiment.

FIG. 1 shows a connector assembly of the present embodiment. The connector assembly includes a connector 1 and a connector cover 50 fitted around the connector 1 to cover the connector 1. A reference numeral C indicates a central axis of the connector assembly, and the connector 1 and the connector cover 50 are coaxially arranged on the central axis C. Hereinafter, unless otherwise specified, an axial direction, a radial direction, and a circumferential direction mean an axial direction, a radial direction, and a circumferential direction based on the central axis C. For convenience, front, rear, left, right, upper, and lower directions are defined as shown in the FIGURE. A left side in the FIGURE is an axial tip end side or a front side, and a right side in the FIGURE is an axial base end side or a rear side.

The connector 1 is configured to be electrically and coaxially butt-connected to a connector of a component 90 (indicated by an imaginary line) attached to an engine (internal combustion engine), that is, a mating connector 91. In the present embodiment, the engine is a diesel engine, and the component 90 is a fuel injection injector. However, a type, a form, a use, and the like thereof are not particularly limited. The connector 1 is attached to one end of a wire harness (not shown). Another connector is attached to the other end of the wire harness, and the other connector is connected to an electronic control unit. The connector 1 is a substantially resin-made component in which a metal terminal or the like is embedded.

The connector 1 includes a connector body 4 extending in the axial direction between a base end portion 2 and a tip end portion 3, a lever 5 disposed on radially outward (upward) of the connector body 4 and extending in the axial direction, and an elastically deformable coupling portion 6 integrally coupling an intermediate portion of the lever 5 to the connector body 4 and serving as a rotation center of the lever 5. Further, the connector 1 includes an engaging portion 8 provided at a tip end portion 7 of the lever 5 and to be engaged with the mating connector 91, and an operation surface 10 provided on a base end portion 9 of the lever 5 and directed radially outward (upward) to rotate the lever 5.

Although not shown, a plurality of metal terminals are embedded in the tip end portion 3 of the connector body 4. These metal terminals are exposed at a tip end surface (front end surface) 11 of the tip end portion 3. When the tip end portion 3 of the connector body 4 is coaxially connected to the mating connector 91, the metal terminals inside the tip end portion 3 are brought into contact with metal terminals inside the mating connector 91 to conduct electricity. In the present embodiment, the connector 1 is a male connector, the mating connector 91 is a female connector, and the tip end portion 3 of the connector body 4 is inserted into the mating connector 91. However, this may be reversed.

Although not shown, a plurality of electric wires of a wire harness are inserted into the base end portion 2 of the connector body 4 from a base end side. The electric wires are electrically connected to the metal terminals inside the connector body 4.

A first annular plate 12 is integrally provided on an axially intermediate portion of the connector body 4 so as to encircle a circumference thereof in the circumferential direction. A tubular portion 92 formed at a rear-directed tip end portion of the mating connector 91 is fitted around the first annular plate 12. Accordingly, insertion of the mating connector 91 is guided, and a position of the mating connector 91 in upper-lower and left-right directions with respect to the connector body 4 is accurately determined. A waterproof rubber 21 is attached in advance to a position immediately before the first annular plate 12 in the connector body 4, and the waterproof rubber 21 seals a gap between the tubular portion 92 and the connector body 4.

At the axially intermediate portion of the connector body 4, a second annular plate 13 is also integrally provided at a position close to the first annular plate 12 and immediately behind the first annular plate 12 so as to encircle the circumference of the connector body 4 in the circumferential direction. The second annular plate 13 is formed to have a larger diameter than the first annular plate 12, and is abutted against the tubular portion 92 to restrict a maximum insertion amount when the mating connector 91 is inserted. The coupling portion 6 is formed by a part of the second annular plate 13.

The coupling portion 6 extends in the radial direction, that is, the upper-lower direction, between the connector body 4 and the lever 5, and is integrally connected to both. By elastically deforming the coupling portion 6 so as to curve in the front-rear direction, the lever 5 is rotated as indicated by an arrow a. The coupling portion 6 serves as a rotation center or a fulcrum at this time.

The tip end portion 7 of the lever 5 has a simple flat plate shape extending parallel to the axial direction from an axial position of the coupling portion 6 toward a tip end side. The engaging portion 8 is formed by an engaging hole 14 formed penetrating the tip end portion 7. An engaging portion of the mating connector 91, that is, an engaging projection 93 having a triangular cross-section is inserted into the engaging hole 14. The insertion locks the connector 1 to the mating connector 91. A relationship between the engaging hole and the engaging projection may be reversed.

The base end portion 9 of the lever 5 extends in the axial direction from the axial position of the coupling portion 6 toward a base end side, and more accurately, extends slightly obliquely with respect to the axial direction. The base end portion 9 is thicker than the tip end portion 7, and has therein a hollow hole 15 extending in the axial direction and penetrating in the left-right direction. A radial gap, that is, a base-end-side gap 16 is formed between the base end portion 9 of the lever 5 and the base end portion 2 of the connector body 4. Accordingly, the lever 5 can be rotated by pushing down the base end portion 9 of the lever 5.

The operation surface 10 is a portion to which a pressing force from an operator is applied when the lever 5 is rotated in an unlocking direction B. The operation surface 10 is a flat surface.

The connector 1 is provided with left and right side plates (only one on a right side is shown) 18 and a bottom plate 19 integrally extending forward from the second annular plate 13. The left and right side plates 18 are separated from the tip end portion 7 of the lever 5 and are not connected to each other so as not to hinder the rotating operation of the lever 5. On the other hand, the left and right side plates 18 and the bottom plate 19 are integrally connected.

A bridge 20 integrally formed to cross the left and right side plates 18 is disposed at a position radially outward (upward) of the tip end portion 7 of the lever 5. When the lever 5 is rotated in the unlocking direction B, the bridge 20 is abutted against the lever tip end portion 7 to restrict the maximum rotation amount. Accordingly, the maximum rotation amount of the lever 5 can be restricted, and damage to the lever 5 can be prevented.

A reference numeral 22 indicates a guide groove provided in the bottom plate 19 and extending in the axial direction. The guide groove 22 slidably guides a positioning projection 94 of the mating connector 91 when the mating connector 91 is inserted, and positions the mating connector 91 in the circumferential direction.

The connector cover 50 covers substantially the entire length of the connector 1. The connector cover 50 of the present embodiment is characterized by including an abutment portion 51 abutted against the operation surface 10.

The connector cover 50 is formed in a substantially bottomed tubular shape. The abutment portion 51 is made of an elastic material (rubber in the present embodiment), and in the present embodiment, the whole of the connector cover 50 including the abutment portion 51 is made of an elastic material. The abutment portion 51 is pushed by a rear end portion of the operation surface 10 so as to be slightly elastically recessed, and is in surface contact with the rear end portion of the operation surface 10.

No portion of the connector cover 50 exists in the base-end-side gap 16 of the connector 1. That is, no portion of the connector cover 50 is sandwiched between the base end portion 9 of the lever 5 and the base end portion 2 of the connector body 4. This makes it possible to freely move the base end portion 9 downward when the lever 5 is rotated in the unlocking direction B, and the rotation operation of the lever 5 can be prevented from being hindered by the connector cover 50.

Further, a radial gap, that is, a tip-end-side gap 52 is formed between the tip end portion 7 of the lever 5 and the connector cover 50. Accordingly, the tip end portion 7 can be freely moved upward when the lever 5 is rotated in the unlocking direction B, and the rotation operation of the lever 5 can be prevented from being hindered by the connector cover 50.

The connector cover 50 includes a base end surface portion 53 located closest to the base end side, and a tube-shaped portion 54 integrally extending from an outer peripheral edge portion of the base end surface portion 53 toward the tip end side. The abutment portion 51 is formed by an upper end inner surface of the tube-shaped portion 54 which is located in the vicinity of the base end surface portion 53. The tip-end-side gap 52 is formed between an axially intermediate upper end portion of the tube-shaped portion 54 and the tip end portion 7 of the lever 5.

The base end surface portion 53 is provided with an insertion hole 55 through which the base end portion 2 of the connector body 4 is inserted and a drain hole 56 formed by cutting out a lower portion of the insertion hole 55. Even when the wire harness is already attached to the connector 1, the connector cover 50 can be attached to the connector 1 by inserting the connector 1 into the insertion hole 55 of the connector cover 50 from the tip end side.

On the base end surface portion 53 of the connector cover 50, another abutment portion 54 abutted against a base end surface portion 24 of the lever 5 is formed.

Next, operations and effects of the present embodiment will be described.

Before being connected to the mating connector 91, the connector assembly is in an initial state as shown in the FIGURE. At this time, the connector cover 50 is fitted and attached to the connector 1 in advance, and the lever 5 is in a lock position as shown in the FIGURE.

In this state, when the connector assembly is moved forward and starts to be connected to the mating connector 91, the tip end portion 3 of the connector body 4 is inserted into the mating connector 91. Further, the tip end portion 7 of the lever 5 is abutted against the engaging projection 93 of the mating connector 91, and the tip end portion 7 is lifted by the engaging projection 93, and the lever 5 is rotated in the unlocking direction B.

Thereafter, when the engaging projection 93 is inserted into the engaging hole 14 of the lever 5, the lever 5 is rotated in a locking direction A and elastically returned to the original locking position. Thus, the connector 1 is locked to the mating connector 91, and the connection is completed.

On the other hand, when detaching the connector 1 from the mating connector 91, the operator pushes down the operation surface 10 of the lever 5 from above the connector cover 50. Then, the lever 5 is rotated in the unlocking direction B, and the engagement between the engaging hole 14 and the engaging projection 93 is released. By pulling the connector assembly rearward while maintaining this state, the connector 1 can be pulled out from the mating connector 91. Thus, the connector 1 can be attached and detached with the connector cover 50 attached, which is convenient.

During operation of the engine, vibration of the engine is transmitted to the connector 1 through the component 90 and the mating connector 91, and the connector 1 vibrates accordingly. Then, the lever 5 is rotated due to the vibration, the vibration of the connector 1 increases, and the terminals of the connector 1 may be damaged.

That is, when the component 90 vibrates up and down, the connector 1 also vibrates up and down. At this time, when the base end portion 9 of the lever 5 is swung by the connector 1 in the locking direction A (upward), the connector body 4 is inclined in the unlocking direction (downward) with respect to the mating connector 91 due to backlash between the mating connector 91 and the connector 1. As a result, up-down amplitude of the connector 1 increases.

In the present embodiment, the abutment portion 51 abutted against the operation surface 10 of the lever 5 is provided on the connector cover 50. According to this configuration, bending of the base end portion 9 of the lever 5 in the locking direction A can be prevented by the abutment portion 51, and an increase in vibration of the connector 1 can be prevented. Further, a damper function based on the abutment portion 51 is operated, and the vibration of the connector 1 can be attenuated.

Thus, according to the connector assembly of the present embodiment, the vibration of the connector 1 can be effectively reduced and the terminals of the connector 1 can be prevented from being damaged.

Further, in the present embodiment, since the abutment portion 51 is made of an elastic material, the damper function can be exerted more, and the vibration damping effect can be enhanced.

In the present embodiment, since the whole of the connector cover 50 is made of an elastic material, the connector cover 50 can be manufactured more easily as compared with a case where only the abutment portion 51 is made of an elastic material. However, if circumstances permit, only the abutment portion 51 may be made of an elastic material.

Further, in the present embodiment, since the connector cover 50 is provided with another abutment portion 54 abutted against the base end surface portion 24 of the lever 5, the above-described vibration damping function and damper function can be further exhibited.

Further, in the present embodiment, since no portion of the connector cover 50 exists in the base-end-side gap 16 of the connector 1, the lever 5 can be freely rotated in the unlocking direction B without being hindered by the connector cover 50 at the time of attachment and detachment of the connector 1, and the attachment and detachment operation can be smoothly performed.

Further, in the present embodiment, since the tip-end-side gap 52 is formed between the tip end portion 7 of the lever 5 and the connector cover 50, similarly, the lever 5 can be freely rotated in the unlocking direction B without being hindered by the connector cover 50 at the time of attachment and detachment of the connector 1, and the attachment and detachment operation can be smoothly performed.

Although the embodiment of the present disclosure has been described in detail above, various other embodiments and modifications of the present disclosure can be considered.

For example, the abutment portion 51 of the connector cover 50 may be formed by a linear projection that is in line contact with the operation surface 10 or a point projection that is in point contact with the operation surface 10. Further, the abutment portion 51 is not limited to an elastic material, and may be made of any material.

The mating connector to which the connector 1 is connected may be of any type, and may not be provided on a component of the engine.

A mode for carrying out the present disclosure is not limited to the above-described embodiment, and all modifications, applications, and equivalents included in the concept of the present disclosure defined by the claims are included in the present disclosure. Accordingly, the present disclosure should not be construed in a restrictive manner, and can be applied to any other technique that falls within the scope of the present disclosure.

The present application is based on the Japanese patent application (Patent Application No. 2021-053714) filed on Mar. 26, 2021, and the contents thereof are incorporated herein by reference.

INDUSTRIAL APPLICABILITY

The present disclosure has an effect of capable of preventing vibration of a connector, and is useful for a connector assembly or the like.

REFERENCE SIGNS LIST

S: connector assembly
1: connector
2: base end portion
3: tip end portion
4: connector body
5: lever
6: coupling portion
7: tip end portion
8: engaging portion
9: base end portion
10: operation surface
16: base-end-side gap
50: connector cover
51: abutment portion
52: tip-end-side gap
90: component
91: mating connector

The invention claimed is:

1. A connector assembly comprising:
a connector; and
a connector cover fitted around the connector to cover the connector,
wherein the connector includes:
a connector body extending in an axial direction between a base end portion and a tip end portion,
a lever disposed radially outward of the connector body and extending in the axial direction;
an elastically deformable coupling portion integrally coupling an intermediate portion of the lever to the connector body, the coupling portion serving as a rotation center of the lever;

an engaging portion provided at a tip end portion of the lever and configured to be engaged with a mating connector;
an operation surface provided on a base end portion of the lever and directed radially outward of the connector body in order to rotate the lever;
an annular plate provided at an intermediate portion in the axial direction of the connector body to encircle a circumference of the connector body in a circumferential direction;
left and right side plates integrally extending forward from the annular plate; and
a bridge integrally provided to cross the left and right side plates,
the connector cover includes an abutment portion abutted against the operation surface,
the operation surface is a flat surface,
the abutment portion is made of an elastic material, and
the abutment portion is pushed by the operation surface to be elastically recessed, and abutment portion is in surface contact with the operation surface.

2. The connector assembly according to claim 1,
wherein a whole of the connector cover is made of an elastic material.

3. The connector assembly according to claim 1,
wherein a radial gap is formed between the base end portion of the lever and the connector body, and no portion of the connector cover exists in the gap.

4. The connector assembly according to claim 1,
wherein a radial gap is formed between the base end portion of the lever and the base end portion of the connector body, and the base end portion of the lever is radially rotatable around the coupling portion.

5. The connector assembly according to claim 1,
wherein the lever is configured such that, when the operation surface receives a pressing force via the connector cover, the base end portion of the lever is rotatable radially inward around the coupling portion, and the tip end portion of the lever is rotatable radially outward of the connector body around the coupling portion.

6. The connector assembly according to claim 1,
wherein the abutment portion of the connector cover is abutted against the operation surface of the lever, and prevents the base end portion of the lever from radially outwardly rotating around the coupling portion.

7. The connector assembly according to claim 1,
wherein a radial gap is formed between the tip end portion of the lever and the connector cover.

8. The connector assembly according to claim 1,
wherein the connector is configured to be connected to a mating connector of a component attached to an engine.

* * * * *